United States Patent
Jung et al.

(10) Patent No.: US 10,934,431 B2
(45) Date of Patent: Mar. 2, 2021

(54) POLYCARBONATE RESIN COMPOSITION HAVING EXCELLENT HEAT RESISTANCE AND FLUIDITY, AND MOLDED PRODUCT INCLUDING SAME

(71) Applicant: SAMYANG CORPORATION, Seoul (KR)

(72) Inventors: Seung Pil Jung, Daegu (KR); Jung Up Park, Daegu (KR); Jin Sik Choi, Icheon-si (KR); Seong Hyen Heo, Busan (KR); Kyung Moo Shin, Daejeon (KR)

(73) Assignee: SAMYANG CORPORATION, Seoul (KR)

( * ) Notice: Subject to any disclaimer, the term of this patent is extended or adjusted under 35 U.S.C. 154(b) by 15 days.

(21) Appl. No.: 16/467,891

(22) PCT Filed: Nov. 10, 2017

(86) PCT No.: PCT/KR2017/012713
§ 371 (c)(1),
(2) Date: Jun. 7, 2019

(87) PCT Pub. No.: WO2018/105907
PCT Pub. Date: Jun. 14, 2018

(65) Prior Publication Data
US 2020/0087509 A1    Mar. 19, 2020

(30) Foreign Application Priority Data

Dec. 8, 2016    (KR) .................. 10-2016-0166523

(51) Int. Cl.
| | | |
|---|---|---|
| C08L 69/00 | (2006.01) |
| C08L 67/03 | (2006.01) |
| C08L 81/06 | (2006.01) |
| C08G 64/06 | (2006.01) |
| C08G 64/18 | (2006.01) |
| C08G 77/448 | (2006.01) |
| C08L 83/10 | (2006.01) |

(52) U.S. Cl.
CPC .......... *C08L 69/005* (2013.01); *C08G 64/06* (2013.01); *C08G 64/186* (2013.01); *C08G 77/448* (2013.01); *C08L 69/00* (2013.01); *C08L 81/06* (2013.01); *C08L 83/10* (2013.01); *C08L 2201/08* (2013.01); *C08L 2201/10* (2013.01); *C08L 2203/20* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 2,999,835 A | 9/1961 | Goldberg | |
| 3,028,365 A | 4/1962 | Schnell et al. | |
| 3,153,008 A | 10/1964 | Fox | |
| 3,334,154 A | 8/1967 | Kim | |
| 4,652,608 A * | 3/1987 | Parker .................. | C08G 63/193 525/132 |
| 4,918,149 A | 4/1990 | Clagett et al. | |
| 5,077,351 A | 12/1991 | Matzner et al. | |
| 2010/0168311 A1 | 7/2010 | Jansen et al. | |
| 2013/0196131 A1 | 8/2013 | Malinoski et al. | |
| 2014/0200308 A1 | 7/2014 | Rai et al. | |
| 2016/0024301 A1 * | 1/2016 | Hayashida .............. | C08L 83/10 523/452 |

FOREIGN PATENT DOCUMENTS

| | | |
|---|---|---|
| JP | 3095412 B2 | 10/2000 |
| KR | 10-2011-0117068 A | 10/2011 |
| KR | 10-2014-0054174 A | 5/2014 |
| KR | 10-2015-0104628 A | 9/2015 |
| WO | WO 2016/063154 A1 | 4/2016 |

OTHER PUBLICATIONS

International Search Report for PCT/KR2017/012713 (PCT/ISA/210) dated Mar. 5, 2018, with English translation.

* cited by examiner

*Primary Examiner* — David J Buttner
(74) *Attorney, Agent, or Firm* — Birch, Stewart, Kolasch & Birch, LLP.

(57) ABSTRACT

Disclosed is a polycarbonate resin composition including (1) a polyester compound having a structure of chemical formula 1 as defined herein or a phenyl-arylene ether sulfone compound having a structure of chemical formula 2 as defined herein; (2) a polycarbonate block copolymer; and (3) a thermoplastic aromatic polycarbonate resin or a polysiloxane-polycarbonate resin; and a molded product including the same. The polycarbonate resin composition exhibits remarkably excellent heat resistance compared to existing high heat resistance polycarbonate resins, and has an excellent balance of physical properties such as fluidity.

10 Claims, No Drawings

POLYCARBONATE RESIN COMPOSITION HAVING EXCELLENT HEAT RESISTANCE AND FLUIDITY, AND MOLDED PRODUCT INCLUDING SAME

TECHNICAL FIELD

The present invention relates to a polycarbonate resin composition having excellent heat resistance and flowability and molded article comprising the same, and more specifically, a polycarbonate resin composition comprising a polycarbonate copolymer together with a compound of a specific structure and a specific resin, which shows remarkably excellent heat resistance as compared with conventional highly heat-resistant polycarbonate resins, and also has good balance of properties such as flowability, etc., and a molded article comprising the same.

BACKGROUND ART

Polycarbonate resin has good heat resistance, mechanical properties (in particular, impact strength) and transparency. Thus, it has been extensively used as electric components, mechanical components and industrial resin. In the electric/electronic fields, in particular, when polycarbonate resin is used for TV housing, computer monitor housing, copier, printer, notebook battery, lithium battery case material, etc., releasing considerable heat, good heat resistance is required as well as mechanical properties.

However, general polycarbonate resins are selectively eroded in a specific solvent and have no resistance thereto. Although they have good anti-creep property to static load, general polycarbonate resins are relatively easily broken when temperature and several environmental conditions are coupled, and have the problem of complicated resistance to dynamic load.

Accordingly, researches to improve heat resistance of polycarbonate resins have been continuously conducted, resulting in development of highly heat-resistant polycarbonate resins (for instance, U.S. Pat. Nos. 5,070,177, 4,918, 149, etc.). In general, such highly heat-resistant polycarbonates have increased hydrolyzability and improved heat deformation temperature by modifying bisphenol A to incorporate substituents having stereochemistry at ortho position.

However, conventional highly heat-resistant polycarbonates as such have the problem of poor impact resistance and flowability, as compared with general polycarbonate resins.

Problems to be Solved

The present invention is intended to resolve the above-stated problems of the prior arts, and has an object of providing a polycarbonate resin composition which shows remarkably excellent heat resistance as compared with conventional highly heat-resistant polycarbonate resins, and also has good balance of properties such as flowability, etc., and a molded article comprising the same.

Technical Means

In order to resolve the above-stated problems, the present invention provides a polycarbonate resin composition comprising (1) a polyester compound having a structure of the following chemical formula 1 or a phenyl-arylene ether sulfone compound having a structure of the following chemical formula 2; (2) a polycarbonate block copolymer; and (3) a thermoplastic aromatic polycarbonate resin or a polysiloxane-polycarbonate resin:

[Chemical formula 1]

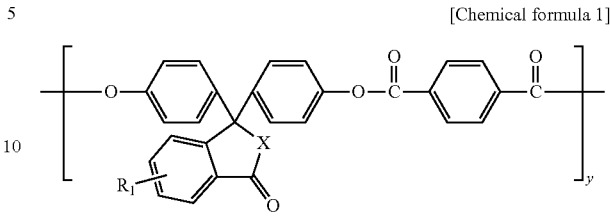

in the above chemical formula 1, $R_1$ independently represents hydrogen atom, alkyl having 1 to 4 carbon atoms, cycloalkyl having 3 to 6 carbon atoms, cycloalkylalkyl having 4 to 10 carbon atoms, or aryl having 6 to 10 carbon atoms;

X represents oxygen atom or $NR_2$, where $R_2$ represents hydrogen atom; alkyl having 1 to 4 carbon atoms; cycloalkyl having 3 to 10 carbon atoms which is unsubstituted or substituted with one or more substituents selected from the group consisting of halogen atoms and alkyl groups having 1 to 4 carbon atoms; or aryl having 6 to 10 carbon atoms which is unsubstituted or substituted with one or more substituents selected from the group consisting of halogen atoms and alkyl groups having 1 to 4 carbon atoms; and y is an integer of 2 to 50;

[Chemical formula 2]

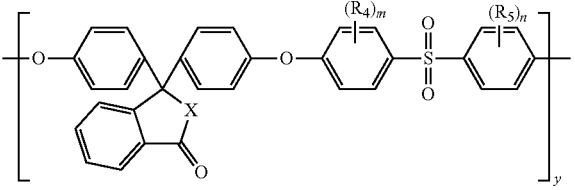

in the above chemical formula 2, each of $R_4$ and $R_5$ independently represents hydrocarbyl having 1 to 10 carbon atoms:

each of m and n is independently an integer of 0 to 4;

y is an integer of 2 to 150; and

X represents oxygen atom or $NR_2$, where $R_2$ represents hydrogen atom; alkyl having 1 to 4 carbon atoms; cycloalkyl having 3 to 10 carbon atoms which is unsubstituted or substituted with one or more substituents selected from the group consisting of halogen atoms and alkyl groups having 1 to 4 carbon atoms; or aryl having 6 to 10 carbon atoms which is unsubstituted or substituted with one or more substituents selected from the group consisting of halogen atoms and alkyl groups having 1 to 4 carbon atoms.

In another aspect, the present invention provides a molded article comprising the polycarbonate resin composition.

Effect of the Invention

The polycarbonate resin composition according to the present invention has remarkably excellent heat resistance and also has good balance of properties such as impact strength, transparency, flowability, etc., and thus it can be usefully applied in products requiring heat resistance such as housing of office devices and electric/electronic products, automotive interior/exterior parts, etc., and particularly because of the high flowability, a molded article having good moldability can be produced therefrom.

CONCRETE MODE FOR CARRYING OUT THE INVENTION

The present invention is explained in more detail below.

The polycarbonate resin composition of the present invention comprises (1) a polyester compound having a structure of the following chemical formula 1 or a phenyl-arylene ether sulfone compound having a structure of the following chemical formula 2; (2) a polycarbonate block copolymer; and (3) a thermoplastic aromatic polycarbonate resin or a polysiloxane-polycarbonate resin.

The polycarbonate resin composition of the present invention can comprise (1) a polyester compound having a structure of chemical formula 1 or a phenyl-arylene ether sulfone compound having a structure of chemical formula 2 in an amount of 10 to 80 parts by weight, preferably 20 to 70 parts by weight, and more preferably 30 to 60 parts by weight, based on 100 parts by weight of the composition. If the amount of the polyester compound or the phenyl-arylene ether sulfone compound is less than 10 parts by weight, the heat resistance may be lowered, and if it is greater than 80 parts by weight, the impact strength may be lowered.

The polycarbonate resin composition of the present invention can comprise (2) a polycarbonate block copolymer in an amount of 5 to 60 parts by weight, preferably 10 to 50 parts by weight, and more preferably 10 to 40 parts by weight, based on 100 parts by weight of the composition. If the amount of the polycarbonate block copolymer is less than 5 parts by weight, the heat resistance may be lowered, and if it is greater than 60 parts by weight, the impact strength may be lowered.

The polycarbonate resin composition of the present invention can comprise (3) a thermoplastic aromatic polycarbonate resin or a polysiloxane-polycarbonate resin in an amount of 10 to 60 parts by weight, preferably 15 to 50 parts by weight, and more preferably 20 to 40 parts by weight, based on 100 parts by weight of the composition. If the amount of the thermoplastic aromatic polycarbonate resin or the polysiloxane-polycarbonate resin is less than 10 parts by weight, the impact strength may be lowered, and if it is greater than 60 parts by weight, the heat resistance may be lowered.

(A) Polyester Compound Having a Structure of Chemical Formula 1

The polycarbonate resin composition of the present invention can comprise a polyester compound having a structure of the following chemical formula 1:

[Chemical formula 1]

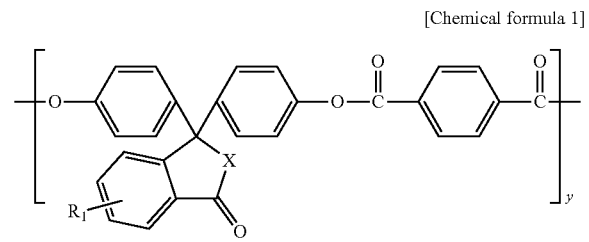

in the above chemical formula 1, $R_1$ independently represents hydrogen atom, alkyl having 1 to 4 carbon atoms, cycloalkyl having 3 to 6 carbon atoms, cycloalkylalkyl having 4 to 10 carbon atoms, or aryl having 6 to 10 carbon atoms;

X represents oxygen atom or $NR_2$, where $R_2$ represents hydrogen atom; alkyl having 1 to 4 carbon atoms (which may be, for example, methyl, ethyl, propyl or butyl); cycloalkyl having 3 to 10 carbon atoms which is unsubstituted or substituted with one or more substituents selected from the group consisting of halogen atoms and alkyl groups having 1 to 4 carbon atoms (which may be, for example, cyclopropane, cyclobutane, cyclopentane, cyclohexane, cycloheptane, cyclooctane, chlorocyclohexane, methylcyclopentane, 1-bromo-2-methyl-cyclopentane or 1-chloro-1-ethyl-cyclohexane); or aryl having 6 to 10 carbon atoms which is unsubstituted or substituted with one or more substituents selected from the group consisting of halogen atoms and alkyl groups having 1 to 4 carbon atoms (which may be, for example, phenyl, benzyl, tolyl or chlorophenyl); and y is an integer of 2 to 50.

According to an embodiment of the present invention, the polyester compound having a structure of chemical formula 1 may be prepared by condensation reaction of a compound represented by the following chemical formula 1-1 and a compound represented by the following chemical formula 1-2:

[Chemical formula 1-1]

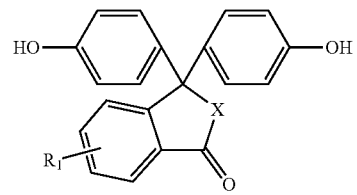

[Chemical formula 1-2]

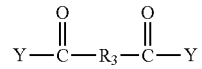

in the above chemical formulas 1-1 and 1-2, $R_1$ independently represents hydrogen atom, alkyl having 1 to 4 carbon atoms, cycloalkyl having 3 to 6 carbon atoms, cycloalkylalkyl having 4 to 10 carbon atoms, or aryl having 6 to 10 carbon atoms;

X represents oxygen atom or $NR_2$, where $R_2$ represents hydrogen atom; alkyl having 1 to 4 carbon atoms (which may be, for example, methyl, ethyl, propyl or butyl); cycloalkyl having 3 to 10 carbon atoms which is unsubstituted or substituted with one or more substituents selected from the group consisting of halogen atoms and alkyl groups having 1 to 4 carbon atoms (which may be, for example, cyclopropane, cyclobutane, cyclopentane, cyclohexane, cycloheptane, cyclooctane, chlorocyclohexane, methylcyclopentane, 1-bromo-2-methyl-cyclopentane or 1-chloro-1-ethyl-cyclohexane); or aryl having 6 to 10 carbon atoms which is unsubstituted or substituted with one or more substituents selected from the group consisting of halogen atoms and alkyl groups having 1 to 4 carbon atoms (which may be, for example, phenyl, benzyl, tolyl or chlorophenyl); and Y independently represents hydroxyl or halogen atom (for example, Cl, F or Br); and $R_3$ represents benzene ring.

The polyester compound having a structure of the above chemical formula 1 may have a number average molecular weight (Mn) of 500 to 30,000 g/mol measured by GPC (gel permeation chromatography), but it is not limited thereto.

(B) Phenyl-Arylene Ether Sulfone Compound Having a Structure of Chemical Formula 2

The polycarbonate resin composition of the present invention can comprise a phenyl-arylene ether sulfone compound having a structure of the following chemical formula 2:

[Chemical formula 2]

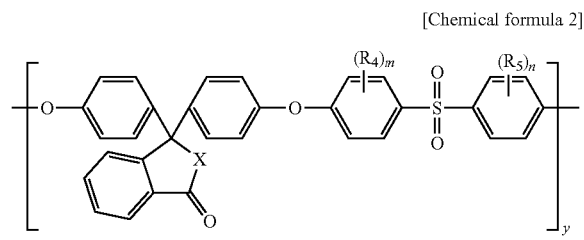

in the above chemical formula 2, each of $R_4$ and $R_5$ independently represents hydrocarbyl having 1 to 10 carbon atoms, and is preferably selected from the group consisting of alkyl having 1 to 10 carbon atoms (which may be, for example, methyl, ethyl, propyl or butyl), alkoxy having 1 to 10 carbon atoms (which may be, for example, methoxy, ethoxy, propoxy or butoxy) and aryl having 6 to 10 carbon atoms (which may be, for example, phenyl, benzyl, tolyl or chlorophenyl);

each of m and n is independently an integer of 0 to 4, and preferably 0 or 1;

y is an integer of 2 to 150, preferably an integer of 10 to 100, and more preferably an integer of 15 to 100.

In addition, in the above chemical formula 2,

X represents oxygen atom or $NR_2$, where $R_2$ represents hydrogen atom; alkyl having 1 to 4 carbon atoms (which may be, for example, methyl, ethyl, propyl or butyl); cycloalkyl having 3 to 10 carbon atoms which is unsubstituted or substituted with one or more substituents selected from the group consisting of halogen atoms and alkyl groups having 1 to 4 carbon atoms (which may be, for example, cyclopropane, cyclobutane, cyclopentane, cyclohexane, cycloheptane, cyclooctane, chlorocyclohexane, methylcyclopentane, 1-bromo-2-methyl-cyclopentane or 1-chloro-1-ethyl-cyclohexane); or aryl having 6 to 10 carbon atoms which is unsubstituted or substituted with one or more substituents selected from the group consisting of halogen atoms and alkyl groups having 1 to 4 carbon atoms (which may be, for example, phenyl, benzyl, tolyl or chlorophenyl).

The phenyl-arylene ether sulfone compound having a structure of the above chemical formula 2 may be a polymer prepared by polymerization condensation reaction of a compound represented by the following chemical formula 2-1 and a compound represented by the following chemical formula 2-2 in the presence of alkali metal or alkali metal salt, where the polymerization condensation reaction can be conducted in a conventionally used solvent, for example, N-methylpyrrolidone (NMP):

[Chemical formula 2-1]

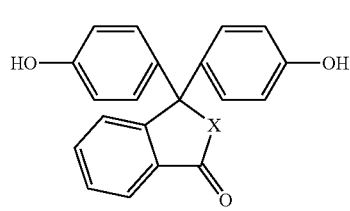

in the above chemical formula 2-1,

X represents oxygen atom or $NR_2$, where $R_2$ represents hydrogen atom; alkyl having 1 to 4 carbon atoms (which may be, for example, methyl, ethyl, propyl or butyl); cycloalkyl having 3 to 10 carbon atoms which is unsubstituted or substituted with one or more substituents selected from the group consisting of halogen atoms and alkyl groups having 1 to 4 carbon atoms (which may be, for example, cyclopropane, cyclobutane, cyclopentane, cyclohexane, cycloheptane, cyclooctane, chlorocyclohexane, methylcyclopentane, 1-bromo-2-methyl-cyclopentane or 1-chloro-1-ethyl-cyclohexane); or aryl having 6 to 10 carbon atoms which is unsubstituted or substituted with one or more substituents selected from the group consisting of halogen atoms and alkyl groups having 1 to 4 carbon atoms (which may be, for example, phenyl, benzyl, tolyl or chlorophenyl);

[Chemical formula 2-2]

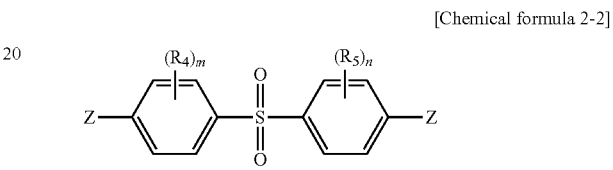

in the above chemical formula 2-2, each of $R_4$ and $R_5$ independently represents hydrocarbyl having 1 to 10 carbon atoms, and is preferably selected from the group consisting of alkyl having 1 to 10 carbon atoms (which may be, for example, methyl, ethyl, propyl or butyl), alkoxy having 1 to 10 carbon atoms (which may be, for example, methoxy, ethoxy, propoxy or butoxy) and aryl having 6 to 10 carbon atoms (which may be, for example, phenyl, benzyl, tolyl or chlorophenyl);

Z is halogen atom or hydroxyl, where the halogen atom may be preferably Cl, F or Br; and each of m and n is independently an integer of 0 to 4, and preferably 0 or 1.

The polymerization condensation reaction for preparing a phenyl-arylene ether sulfone compound having a structure of the above chemical formula 2 may be conducted through conventional polymerization condensation reactions, with no special limitation thereto. For example, the polymerization condensation reaction may be conducted at a temperature of 160 to 200° C., under atmospheric pressure for 5 to 10 hours, in the presence of alkali metal or alkali metal salt catalyst (for example, potassium carbonate), in a reaction solvent selected from N-methyl-2-pyrrolidone (NMP), dimethyl sulfoxide (DMSO), dimethyl acetamide (DMAc), dimethyl formamide (DMF), sulfolane, diphenyl sulfone (DPS) or dimethyl sulfone (DMS), a cosolvent selected from chlorobenzene or tetrahydrofuran (THF), or a solvent mixture of the reaction solvent and the cosolvent.

After the polymerization condensation reaction is completed, the polymerization condensation reaction product is diluted with a dilution solvent (wherein the dilution solvent may be the same as the above reaction solvent), and from the diluted reaction product, a halogenated product of alkali metal (salt of alkali metal from the alkali metal salt catalyst and halogen from the dihalogenodiaryl sulfone compound, for example, KCl) generated during the reaction is removed. At this time, the removal of the halogenated product of alkali metal may be conducted by passing the diluted reaction mixture through celite filter, or by using a decanter centrifuge using specific gravity difference. Then, the diluted and filtered reaction product is precipitated in a solvent (for example, alcohol such as methanol, or water), the precipitated product is washed with water (for example, distilled water) or the like and then dried, thereby a phenyl-arylene ether sulfone compound having a structure of the above chemical formula 2 can be prepared.

The reaction molar ratio of a compound of the above chemical formula 2-1: a compound of the above chemical formula 2-2 may be 1:0.7 to 1:1, and preferably 1:0.8 to 1:0.9. By controlling the reaction molar ratio within the above range, a phenyl-arylene ether sulfone compound having a structure of the above chemical formula 2 can be obtained with high yield.

The phenyl-arylene ether sulfone compound having a structure of the above chemical formula 2 may have a number average molecular weight (Mn) of 500 to 30,000 g/mol measured by GPC (gel permeation chromatography), but it is not limited thereto.

(C) Polycarbonate Block

In the present invention, the polycarbonate block, which is contained as repeating units in the polycarbonate block copolymer explained below, is incorporated into the polycarbonate block copolymer by reacting a polycarbonate oligomer with a polyester compound having a structure represented by the above chemical formula 1 or a phenyl-arylene ether sulfone compound having a structure represented by the above chemical formula 2.

There is no special limitation to the method for preparing the polycarbonate oligomer. For example, it may be prepared by a phosgene method mixing a dihydric phenol compound and phosgene together, but it is not limited thereto.

The dihydric phenol compound used in the polycarbonate oligomer preparation may be, for example, a compound represented by the following chemical formula 3:

[Chemical formula 3]

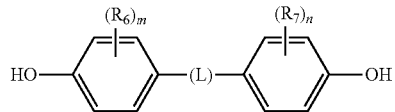

in the above chemical formula 3,

L is a linear, branched or cyclic alkylene group having no functional group; or a linear, branched or cyclic alkylene group comprising a functional group selected from the group consisting of sulfide, ether, sulfoxide, sulfone, ketone, phenyl, isobutylphenyl and naphthyl, and preferably, L may be a linear, branched or cyclic alkylene group having 1 to 10 carbon atoms;

each of $R_6$ and $R_7$ is independently halogen atom; or linear, branched or cyclic alkyl group; and each of m and n is independently an integer of 0 to 4, and preferably 0 or 1.

The compound of the above chemical formula 3 may be, for example, bis(4-hydroxyphenyl)methane, bis(4-hydroxyphenyl)phenylmethane, bis(4-hydroxyphenyl)naphthylmethane, bis(4-hydroxyphenyl)-(4-isobutylphenyl)methane, 1,1-bis(4-hydroxyphenyl)ethane, 1-ethyl-1,1-bis(4-hydroxyphenyl)propane, 1-phenyl-1,1-bis(4-hydroxyphenyl)ethane, 1-naphthyl-1,1-bis(4-hydroxyphenyl)ethane, 1,2-bis(4-hydroxyphenyl)ethane, 1,10-bis(4-hydroxyphenyl)decane, 2-methyl-1,1-bis(4-hydroxyphenyl)propane, 2,2-bis(4-hydroxyphenyl)propane, 2,2-bis(4-hydroxyphenyl)butane, 2,2-bis(4-hydroxyphenyl)pentane, 2,2-bis(4-hydroxyphenyl)hexane, 2,2-bis(4-hydroxyphenyl)nonane, 2,2-bis(3-methyl-4-hydroxyphenyl)propane, 2,2-bis(3-fluoro-4-hydroxyphenyl)propane, 4-methyl-2,2-bis(4-hydroxyphenyl)pentane, 4,4-bis(4-hydroxyphenyl)heptane, diphenyl-bis(4-hydroxyphenyl)methane, resorcinol, hydroquinone, 4,4'-dihydroxyphenyl ether[bis(4-hydroxyphenyl) ether], 4,4'-dihydroxy-2,5-dihdroxydiphenyl ether, 4,4'-dihydroxy-3,3'-dichlorodiphenyl ether, bis(3,5-dimethyl-4-hydroxyphenyl)ether, bis(3,5-dichloro-4-hydroxyphenyl) ether, 1,4-dihydroxy-2,5-dichlorobenzene, 1,4-dihydroxy-3-methylbenzene, 4,4'-dihydroxydiphenol[p,p'-dihydroxyphenyl], 3,3'-dichloro-4,4'-dihydroxyphenyl, 1,1-bis(4-hydroxyphenyl)cyclohexane, 1,1-bis(3,5-dimethyl-4-hydroxyphenyl)cyclohexane, 1,1-bis(3,5-dichloro-4-hydroxyphenyl)cyclohexane, 1,1-bis(3,5-dimethyl-4-hydroxyphenyl)cyclododecane, 1,1-bis(4-hydroxyphenyl)cyclododecane, 1,1-bis(4-hydroxyphenyl)butane, 1,1-bis(4-hydroxyphenyl)decane, 1,4-bis(4-hydroxyphenyl)propane, 1,4-bis(4-hydroxyphenyl)butane, 1,4-bis(4-hydroxyphenyl)isobutane, 2,2-bis(4-hydroxyphenyl)butane, 2,2-bis(3-chloro-4-hydroxyphenyl)propane, bis(3,5-dimethyl-4-hydroxyphenyl)methane, bis(3,5-dichloro-4-hydroxyphenyl)methane, 2,2-bis(3,5-dimethyl-4-hydroxyphenyl)propane, 2,2-bis(3,5-dibromo-4-hydroxyphenyl)propane, 2,2-bis(3,5-dichloro-4-hydroxyphenyl)propane, 2,4-bis(4-hydroxyphenyl)-2-methyl-butane, 4,4'-thiodiphenol[bis(4-hydroxyphenyl) sulfone], bis(3,5-dimethyl-4-hydroxyphenyl)sulfone, bis(3-chloro-4-hydroxyphenyl)sulfone, bis(4-hydroxyphenyl) sulfide, bis(4-hydroxyphenyl)sulfoxide, bis(3-methyl-4-hydroxyphenyl)sulfide, bis(3,5-dimethyl-4-hydroxyphenyl) sulfide, bis(3,5-dibromo-4-hydroxyphenyl)sulfoxide, 4,4'-dihydroxybenzophenone, 3,3',5,5'-tetramethyl-4,4'-dihydroxybenzophenone, 4,4'-dihydroxy diphenyl, methylhydroquinone, 1,5-dihydroxynaphthalene, or 2,6-dihydroxynaphthalene, but it is not limited thereto. Among them, the representative one is 2,2-bis(4-hydroxyphenyl) propane (bisphenol A). For other functional dihydric phenols, U.S. Pat. Nos. 2,999,835, 3,028,365, 3,153,008, 3,334, 154 and 4,131,575, etc, may be referred to. The above dihydric phenol may be used alone or in combination of two or more of them.

According to an embodiment of the present invention, the oligomeric polycarbonate may be prepared by adding the above-explained dihydric phenol compound (for example, bisphenol A) in an aqueous alkaline solution, and then mixing and reacting the resulting mixture with an organic solvent (for example, dichloromethane) containing injected phosgene gas. At this time, the molar ratio of phosgene: dihydric phenol compound may be maintained within a range of about 1:1 to 1.5:1, and preferably 1:1 to 1.2:1, and the prepared oligomeric polycarbonate may have a molecular weight of 1,000 to 2,000.

According to another embodiment of the present invention, the oligomeric polycarbonate may be formed by adding the above-explained dihydric phenol compound (for example, bisphenol A) in an aqueous alkaline solution, then mixing and reacting the resulting mixture with an organic solvent (for example, dichloromethane) containing injected phosgene gas (at this time, the molar ratio of phosgene: dihydric phenol compound may be maintained within a range of about 1:1 to 1.5:1, and preferably 1:1 to 1.2:1), and stepwise adding thereto a molecular weight-controlling agent and a catalyst.

The reaction for forming the polycarbonate oligomer may generally be conducted at a temperature range of about 15 to 60° C. In order to adjust the pH of the reaction mixture, alkali metal hydroxide may be incorporated into the reaction mixture. The alkali metal hydroxide may be, for example, sodium hydroxide.

As the molecular weight-controlling agent, a monofunctional compound similar to a monomer used in preparation of polycarbonate may be used. The monofunctional compound may be, for example, a derivative based on phenol such as p-isopropylphenol, p-tert-butylphenol (PTBP), p-cumylphenol, p-isooctylphenol and p-isononylphenol, or an aliphatic alcohol. Preferably, p-tert-butylphenol (PTBP) may be used.

As the catalyst, a polymerization catalyst and/or a phase transfer catalyst may be used. The polymerization catalyst may be, for example, triethylamine (TEA), and the phase transfer catalyst may be a compound of the following chemical formula 4:

   [Chemical formula 4]

in the above chemical formula 4, $R_8$ independently represents alkyl group having 1 to 10 carbon atoms;

Q represents nitrogen or phosphorus; and

Z represents halogen atom or —$OR_9$ where $R_9$ may represent hydrogen atom, alkyl group having 1 to 18 carbon atoms or aryl group having 6 to 18 carbon atoms.

The phase transfer catalyst may be, for example, [$CH_3(CH_2)_4]_4NZ$, [$CH_3(CH_2)_3]_4PZ$, [$CH_3(CH_2)]_4NZ$, [$CH_3(CH_2)_6]_4NZ$, [$CH_3(CH_2)_4]_4NZ$, $CH_3[CH_3(CH_2)_3]_3NZ$ or $CH_3[CH_3(CH_2)_2]_3NZ$, wherein Z may be Cl, Br or —$OR_9$ where $R_9$ may be hydrogen atom, alkyl group having 1 to 18 carbon atoms or aryl group having 6 to 18 carbon atoms.

The amount of the phase transfer catalyst is preferably about 0.1 to 10% by weight of the reaction mixture. If the amount of the phase transfer catalyst is less than 0.1% by weight, the reactivity may be lowered, and if it is greater than 10% by weight, the phase transfer catalyst may be precipitated and the transparency of the resulting copolymer may deteriorate.

After the polycarbonate oligomer is formed as above, the organic phase dispersed in methylene chloride is washed with alkali and then separated. Subsequently, the organic phase is washed with 0.1 N solution of hydrochloric acid and then rinsed with distilled water 2 or 3 times.

After the rinsing is completed, the concentration of the organic phase dispersed in methylene chloride is adjusted constantly and granulation is conducted by using a constant amount of double-distilled water at a temperature ranging from 40 to 80° C. If the temperature of the double-distilled water is lower than 40° C., the granulation rate is low and thus the granulation time may be too long. If the temperature of the double-distilled water is higher than 80° C., it may be difficult to obtain the polycarbonate in uniformly sized morphology. After the granulation is completed, it is preferable to dry the product at 100 to 110° C., for 5 to 10 hours first, and then at 110 to 120° C., for 5 to 10 hours.

The prepared polycarbonate oligomer may have a viscosity average molecular weight (Mv) of preferably 1,000 to 30,000, and more preferably 1,000 to 15,000. If the viscosity average molecular weight is less than 1,000, the mechanical properties may deteriorate seriously, and if it is greater than 30,000, there may be a problem of lowered reactivity of copolymerization.

(D) Polycarbonate Block Copolymer

The polycarbonate block copolymer contained in the polycarbonate resin composition of the present invention may comprise, as repeating units, a compound selected from a polyester compound having a structure of the above chemical formula 1 or a phenyl-arylene ether sulfone compound having a structure of the above chemical formula 2; and the above-explained polycarbonate block. The polycarbonate block copolymer can be obtained by copolymerization reaction of a compound selected from a polyester compound having a structure of the above chemical formula 1 or a phenyl-arylene ether sulfone compound having a structure of the above chemical formula 2 with the above-explained polycarbonate oligomer.

The polycarbonate block includes a linear polycarbonate block, a branched polycarbonate block, and a combination thereof together. According to an embodiment of the present invention, a linear polycarbonate block is mainly used, but a branched polycarbonate block may be used and both of them may be used in combination.

The amount of the compound selected from a polyester compound having a structure of the above chemical formula 1 or a phenyl-arylene ether sulfone compound having a structure of the above chemical formula 2 contained in the polycarbonate block copolymer of the present invention is preferably 0.5 to 50% by weight, more preferably 5 to 50% by weight, and most preferably 10 to 50% by weight, based on the total weight of the monomer compounds constituting the polycarbonate block copolymer as 100% by weight. If the relative amount of the compound selected from a polyester compound having a structure of the above chemical formula 1 or a phenyl-arylene ether sulfone compound having a structure of the above chemical formula 2 in the polycarbonate block copolymer is less than this range, heat resistance may be lowered. In contrast, if the relative amount is greater than this range, properties such as transparency, flowability, impact strength, etc, may be lowered and the production cost may increase.

The polycarbonate block copolymer used in the present invention preferably has a viscosity average molecular weight (Mv) of 10,000 to 200,000, more preferably 10,000 to 150,000, and still more preferably 15,000 to 70,000, when measured in a methylene chloride solution. If the viscosity average molecular weight of the polycarbonate block copolymer is less than 10,000, the mechanical properties may deteriorate seriously, and if it is greater than 200,000, there may be a problem in the processing of resin due to the increase of melting viscosity.

The polycarbonate block copolymer used in the present invention may be prepared by preparing a polycarbonate oligomer as explained above, and then copolymerizing the prepared polycarbonate oligomer with the compound selected from a polyester compound having a structure of the above chemical formula 1 or a phenyl-arylene ether sulfone compound having a structure of the above chemical formula 2.

Preferably, when the polycarbonate resin composition of the present invention comprises a polyester compound having a structure of the above chemical formula 1 as the component (1), the polycarbonate block copolymer may be prepared by copolymerizing the polycarbonate oligomer and the polyester compound having a structure of the above chemical formula 1, and when the polycarbonate resin composition of the present invention comprises a phenyl-arylene ether sulfone compound having a structure of the above chemical formula 2 as the component (1), the polycarbonate block copolymer may be prepared by copolymerizing the polycarbonate oligomer and the phenyl-arylene ether sulfone compound having a structure of the above chemical formula 2.

Therefore, another aspect of the present invention provides a method for preparing a polycarbonate block copolymer, comprising the steps of: (1) preparing a compound having a structure of the above chemical formula 1 by condensation reaction of a compound represented by the above chemical formula 1-1 and a compound represented by the above chemical formula 1-2; and (2) copolymerizing the compound obtained in step (1) and a polycarbonate oligomer in the presence of a polymerization catalyst.

In addition, still another aspect of the present invention provides a method for preparing a polycarbonate block copolymer, comprising the steps of: (1) preparing a compound having a structure of the above chemical formula 2 by condensation reaction of a compound represented by the above chemical formula 2-1 and a compound represented by the above chemical formula 2-2; and (2) copolymerizing the compound obtained in step (1) and a polycarbonate oligomer in the presence of a polymerization catalyst.

As the polymerization catalyst, for example, a basic catalyst such as alkali metal hydroxide, alkylammonium salt, alkylamine, etc., may be used.

According to an embodiment of the present invention, the polycarbonate block copolymer of the present invention may be prepared by adding a compound selected from a polyester compound having a structure of the above chemical formula 1 or a phenyl-arylene ether sulfone compound having a structure of the above chemical formula 2, to a mixture of organic phase-aqueous phase containing the already prepared polycarbonate oligomer, and stepwise adding thereto a molecular weight-controlling agent and a catalyst. The molecular weight-controlling agent and the catalyst are explained above.

In addition, according to an embodiment, the organic phase containing the prepared polycarbonate block copolymer dispersed in methylene chloride is washed with alkali and then separated, the organic phase is subsequently washed with 0.1 N solution of hydrochloric acid and then rinsed with distilled water 2 or 3 times, and after the rinsing is completed, the concentration of the organic phase dispersed in methylene chloride is adjusted constantly and granulation is conducted by using a constant amount of pure water at a temperature ranging from 40 to 80° C. If the temperature of the pure water is lower than 40° C., the granulation rate is low and thus the granulation time may be too long. If the temperature of the pure water is higher than 80° C., it may be difficult to obtain the polycarbonate block copolymer in uniformly sized morphology. After the granulation is completed, it is preferable to dry the product at 100 to 110° C., for 5 to 10 hours first, and then at 110 to 120° C., for 5 to 10 hours.

(E) Thermoplastic Aromatic Polycarbonate Resin

The thermoplastic aromatic polycarbonate resin, which can be comprised in the polycarbonate resin composition of the present invention, may be prepared from a dihydric phenol, a carbonate precursor and a molecular weight-controlling agent.

The dihydric phenol is a monomer of the thermoplastic aromatic polycarbonate resin, and it may be, for example, a compound having a structure of the following chemical formula 5:

[Chemical formula 5]

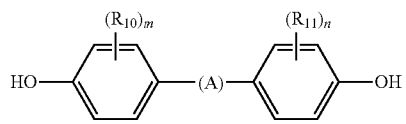

in the above chemical formula 5.

A represents a linear, branched or cyclic alkylene group having no functional group; or a linear, branched or cyclic alkylene group comprising a functional group selected from the group consisting of sulfide, ether, sulfoxide, sulfone, ketone, naphthyl and isobutylphenyl, and preferably, A may be a linear or branched alkylene group having 1 to 10 carbon atoms or a cyclic alkylene group having 3 to 6 carbon atoms:

each of $R_{10}$ and $R_{11}$ independently represents hydrogen atom, halogen atom, or an alkyl group (for example, a linear or branched alkyl group having 1 to 20 carbon atoms, or a cyclic alkyl group having 3 to 20 carbon atoms, and preferably 3 to 6 carbon atoms); and each of m and n is independently an integer of 0 to 4, and preferably 0 or 1.

Non-limiting examples of the dihydric phenol include bis(4-hydroxyphenyl)methane, bis(4-hydroxyphenyl)phenylmethane, bis(4-hydroxyphenyl) naphthylmethane, bis(4-hydroxyphenyl)-(4-isobutylphenyl)methane, 1,1-bis(4-hydroxyphenyl)ethane, 1-ethyl-1,1-bis(4-hydroxyphenyl)propane, 1-phenyl-1,1-bis(4-hydroxyphenyl)ethane, 1-naphthyl-1,1-bis(4-hydroxyphenyl)ethane, 1,2-bis(4-hydroxyphenyl)ethane, 1,10-bis(4-hydroxyphenyl)decane, 2-methyl-1,1-bis(4-hydroxyphenyl)propane, 2,2-bis(4-hydroxyphenyl)propane (bisphenol A), etc., and among them, the representative one is bisphenol A.

The carbonate precursor is a comonomer of the thermoplastic aromatic polycarbonate resin, and it is preferable to use phosgene (carbonyl chloride). Non-limiting examples of the carbonate precursor include carbonyl bromide, bis halo formate, diphenylcarbonate or dimethylcarbonate, etc.

As the molecular weight-controlling agent, the conventionally known compound, i.e., a monofunctional compound similar to a monomer used in preparation of thermoplastic aromatic polycarbonate resin, may be used. As non-limiting examples, derivatives based on phenol (for example, p-isopropylphenol, p-tert-butylphenol, p-cumylphenol, p-isooctylphenol, p-isononylphenol, etc.) may be used, and other various compounds such as aliphatic alcohol, etc, may also be used. Among them, it is most preferable to employ p-tert-butylphenol (PTBP).

Examples of the thermoplastic aromatic polycarbonate resin prepared from a dihydric phenol, a carbonate precursor and a molecular weight-controlling agent as such include, for example, linear polycarbonate resin, branched polycarbonate resin, copolycarbonate resin and polyestercarbonate resin, etc.

In concrete embodiments of the present invention, the thermoplastic aromatic polycarbonate resin preferably has a viscosity average molecular weight (Mv) of 10,000 to 50,000, and more preferably 10,000 to 30,000, when measured in a methylene chloride solution at 25° C. If the viscosity average molecular weight is less than 10,000, the mechanical properties such as impact strength and tensile strength, etc, may deteriorate seriously, and if it is greater than 50,000, there may be a problem in the processing of resin due to the increase of melting viscosity. In particular, the viscosity average molecular weight is more preferably 20,000 or greater in terms of good mechanical properties such as impact strength and tensile strength, etc., and more preferably 30,000 or less in terms of processability.

(F) Polysiloxane-Polycarbonate Resin (Si-PC Resin)

There is no special limitation to the polysiloxane-polycarbonate resin, which can be comprised in the polycarbonate resin composition of the present invention, as long as it comprises siloxane and polycarbonate block as repeating units, and preferably, it may comprise a hydroxy-terminated siloxane of the following chemical formula 6 and a polycarbonate block of the following chemical formula 7 as repeating units:

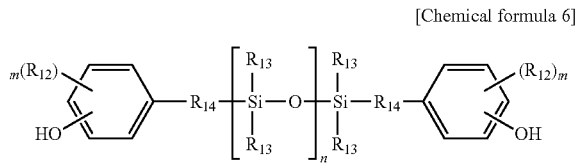

[Chemical formula 6]

in the above chemical formula 6, $R_{12}$ independently represents hydrogen atom, halogen atom, hydroxy group, alkyl group having 1 to 20 carbon atoms, alkoxy group having 1 to 20 carbon atoms, or aryl group having 6 to 20 carbon atoms.

$R_{13}$ independently represents hydrocarbyl group having 1 to 13 carbon atoms or hydroxy group, $R_{14}$ independently represents alkylene group having 2 to 8 carbon atoms, m independently represents an integer of 0 to 4, and n independently represents an integer of 2 to 1,000; and more preferably, in the above chemical formula 6.

$R_{12}$ independently represents hydrogen atom, halogen atom (for example, it may be Cl or Br), hydroxy group, alkyl group having 1 to 13 carbon atoms (for example, it may be methyl, ethyl or propyl), alkoxy group having 1 to 13 carbon atoms (for example, it may be methoxy, ethoxy or propoxy), or aryl group having 6 to 10 carbon atoms (for example, it may be phenyl, chlorophenyl or tolyl), $R_{13}$ independently represents hydroxy group, alkyl group having 1 to 13 carbon atoms, alkoxy group having 1 to 13 carbon atoms, alkenyl group having 2 to 13 carbon atoms, alkenyloxy group having 2 to 13 carbon atoms, cycloalkyl group having 3 to 6 carbon atoms, cycloalkoxy group having 3 to 6 carbon atoms, aryloxy group having 6 to 10 carbon atoms, aralkyl group having 7 to 13 carbon atoms, aralkoxy group having 7 to 13 carbon atoms, alkaryl group having 7 to 13 carbon atoms, or alkaryloxy group having 7 to 13 carbon atoms, $R_{14}$ independently represents alkylene group having 2 to 8 carbon atoms, m independently represents 0 or 1, and n independently represents an integer of 2 to 500, and more preferably an integer of 5 to 100.

The hydroxy-terminated siloxane of the above chemical formula 6 may be prepared, for example, by reacting a compound of the following chemical formula 6-1 having hydroxy group and carbon double bond, and a compound of the following chemical formula 6-2 containing silicon in the presence of platinum catalyst with a molar ratio of 2:1:

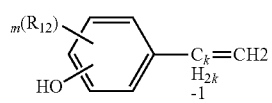

[Chemical formula 6-1]

in the above chemical formula 6-1, $R_{12}$ and m are the same as defined in chemical formula 6 above, and k represents an integer of 1 to 7;

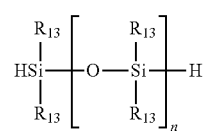

[Chemical formula 6-2]

in the above chemical formula 6-2, $R_{13}$ and n are the same as defined in chemical formula 6 above.

Concretely, as a hydroxy-terminated siloxane of the above chemical formula 6, a siloxane monomer from Dow Corning represented by the following chemical formula 6-3 may be used, but it is not limited thereto:

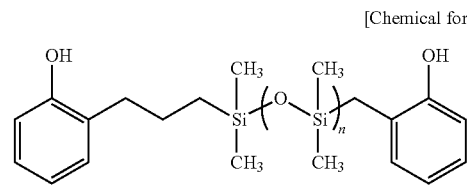

[Chemical formula 6-3]

in the above chemical formula 6-3, n represents an integer of 2 to 1,000, preferably an integer of 2 to 500, and more preferably an integer of 5 to 100.

In addition, regarding the preparation of a hydroxy-terminated siloxane of the above chemical formula 6. U.S. Pat. No. 6,072,011 may be referred to.

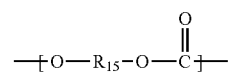

[Chemical formula 7]

in the above chemical formula 7, $R_{15}$ represents an aromatic hydrocarbyl group having 6 to 30 carbon atoms which is unsubstituted or substituted with alkyl group having 1 to 20 carbon atoms and preferably 1 to 13 carbon atoms, cycloalkyl group having 3 to 6 carbon atoms, alkenyl group having 2 to 13 carbon atoms, alkoxy group having 1 to 13 carbon atoms, halogen atom, or nitro group, where the aromatic hydrocarbyl group may be derived from a compound represented by the following chemical formula 8:

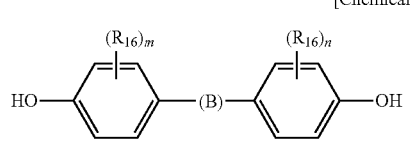

[Chemical formula 8]

in the above chemical formula 8,

B is a linear, branched or cyclic alkylene group having no functional group; or a linear, branched or cyclic alkylene group comprising a functional group selected from the group consisting of sulfide, ether, sulfoxide, sulfone, ketone, naphthyl and isobutylphenyl, and preferably, B may be a linear or branched alkylene group having 1 to 10 carbon atoms or a cyclic alkylene group having 3 to 6 carbon atoms;

each of $R_{16}$ independently represents hydrogen atom, halogen atom, or an alkyl group (for example, a linear or branched alkyl group having 1 to 20 carbon atoms, or a cyclic alkyl group having 3 to 20 carbon atoms, and preferably 3 to 6 carbon atoms); and each of m and n is independently an integer of 0 to 4, and preferably 0 or 1.

The compound of the above chemical formula 8 may be, for example, bis(4-hydroxyphenyl)methane, bis(4-hydroxyphenyl)phenylmethane, bis(4-hydroxyphenyl)naphthylmethane, bis(4-hydroxyphenyl)-(4-isobutylphenyl)methane, 1,1-bis(4-hydroxyphenyl)ethane, 1-ethyl-1,1-bis(4-hydroxyphenyl)propane, 1-phenyl-1,1-bis(4-hydroxyphenyl)ethane, 1-naphthyl-1,1-bis(4-hydroxyphenyl)ethane, 1,2-bis(4-hydroxyphenyl)ethane, 1,10-bis(4-hydroxyphenyl)decane, 2-methyl-1,1-bis(4-hydroxyphenyl)propane, 2,2-bis(4-hydroxyphenyl)propane, 2,2-bis(4-hydroxyphenyl)butane, 2,2-bis(4-hydroxyphenyl)pentane, 2,2-bis(4-hydroxyphenyl)hexane, 2,2-bis(4-hydroxyphenyl)nonane, 2,2-bis(3-methyl-4-hydroxyphenyl)propane, 2,2-bis(3-fluoro-4-hydroxyphenyl)propane, 4-methyl-2,2-bis(4-hydroxyphenyl)pentane, 4,4-bis(4-hydroxyphenyl)heptane, diphenyl-bis(4-hydroxyphenyl)methane, resorcinol, hydroquinone, 4,4'-dihydroxyphenyl ether[bis(4-hydroxyphenyl)ether], 4,4'-dihydroxy-2,5-dihydroxydiphenyl ether, 4,4'-dihydroxy-3,3'-dichlorodiphenyl ether, bis(3,5-dimethyl-4-hydroxyphenyl)ether, bis(3,5-dichloro-4-hydroxyphenyl)ether, 1,4-dihydroxy-2,5-dichlorobenzene, 1,4-dihydroxy-3-methyl benzene, 4,4'-dihydroxydiphenol[p,p'-dihydroxyphenyl], 3,3'-dichloro-4,4'-dihydroxyphenyl, 1,1-bis(4-hydroxyphenyl)cyclohexane, 1,1-bis(3,5-dimethyl-4-hydroxyphenyl)cyclohexane, 1,1-bis(3,5-dichloro-4-hydroxyphenyl)cyclohexane, 1,1-bis(3,5-dimethyl-4-hydroxyphenyl)cyclododecane, 1,1-bis(4-hydroxyphenyl)cyclododecane, 1,1-bis(4-hydroxyphenyl)butane, 1,1-bis(4-hydroxyphenyl)decane, 1,4-bis(4-hydroxyphenyl)propane, 1,4-bis(4-hydroxyphenyl)butane, 1,4-bis(4-hydroxyphenyl)isobutane, 2,2-bis(4-hydroxyphenyl)butane, 2,2-bis(3-chloro-4-hydroxyphenyl)propane, bis(3,5-dimethyl-4-hydroxyphenyl)methane, bis(3,5-dichloro-4-hydroxyphenyl)methane, 2,2-bis(3,5-dimethyl-4-hydroxyphenyl)propane, 2,2-bis(3,5-di bromo-4-hydroxyphenyl)propane, 2,2-bis(3,5-dichloro-4-hydroxyphenyl)propane, 2,4-bis(4-hydroxyphenyl)-2-methyl-butane, 4,4'-thiodiphenol[bis(4-hydroxyphenyl)sulfone], bis(3,5-dimethyl-4-hydroxyphenyl)sulfone, bis(3-chloro-4-hydroxyphenyl)sulfone, bis(4-hydroxyphenyl)sulfide, bis(4-hydroxyphenyl)sulfoxide, bis(3-methyl-4-hydroxyphenyl)sulfide, bis(3,5-dimethyl-4-hydroxyphenyl)sulfide, bis(3,5-dibromo-4-hydroxyphenyl)sulfoxide, 4,4'-dihydroxybenzophenone, 3,3',5,5'-tetramethyl-4,4'-dihydroxybenzophenone, 4,4'-dihydroxy diphenyl, methylhydroquinone, 1,5-dihydroxynaphthalene, or 2,6-dihydroxynaphthalene, but it is not limited thereto. Among them, the representative one is 2,2-bis(4-hydroxyphenyl)propane (bisphenol A). For other functional dihydric phenols, U.S. Pat. Nos. 2,999,835, 3,028,365, 3,153,008, 3,334,154 and 4,131,575, etc, may be referred to. The above dihydric phenol may be used alone or in combination of two or more of them.

In the polysiloxane-polycarbonate resin, the amount ratio of the hydroxy-terminated siloxane:the polycarbonate block is preferably 50 to 99:50 to 1 as weight ratio. If the relative amount of the hydroxy-terminated siloxane part in the polysiloxane-polycarbonate resin is less than the above, flame retardancy and low-temperature impact strength may deteriorate, and if it is greater than the above, properties such as transparency, flowability, heat resistance, room-temperature impact strength, etc, may deteriorate and the production cost may increase.

The polysiloxane-polycarbonate resin preferably has a viscosity average molecular weight (Mv) of 15,000 to 200,000, and more preferably 15,000 to 70,000, when measured in methylene chloride solution. If the viscosity average molecular weight of the polysiloxane-polycarbonate resin is less than 15,000, the mechanical properties may be lowered remarkably, and if it is greater than 200,000, there may be a problem in the processing of resin due to the increase of melting viscosity.

The polysiloxane-polycarbonate resin may be used in a form of homopolymer, copolymer or a mixture thereof. In addition, it is possible to replace the polysiloxane-polycarbonate resin partly or totally with an aromatic polyester-carbonate resin obtained by polymerization in the presence of ester precursor, for example, difunctional carboxylic acid, or copolycarbonate copolymerized with silicon-based resin.

The present invention is explained in more detail through the following Examples and Comparative Examples. However, the scope of the present invention is not limited thereby in any manner.

EXAMPLES

Preparation Example 1: Preparation of Phthalimidine Polyester Oligomer Compound of Chemical Formula 9

N-phenyl 3,3-bis(4-hydroxyphenyl)phthalimidine (PBHPP) (0.6 mole) of the following chemical formula 9-1 was dissolved in 1,657 g of distilled water and fed into a 20 L four-necked reactor. Terephthaloyl chloride (0.5 mole) of the following chemical formula 9-2 was dissolved in 6,000 g of methylene chloride and fed into the four-necked reactor. Then, sodium hydroxide (1.23 mole) was dissolved in distilled water to prepare an aqueous sodium hydroxide solution (10%), and it was fed into the four-necked reactor dropwise over 240 minutes. After the dropping, the mixture was stirred for 60 minutes for phase separation, and the heavy layer was isolated. The isolated heavy layer was precipitated in ethanol, and the precipitate was washed with distilled water and dried in an oven for 24 hours to obtain the phthalimidine polyester oligomer of the following chemical formula 9 (number average molecular weight=6,000), where n in chemical formula 9 was 11.

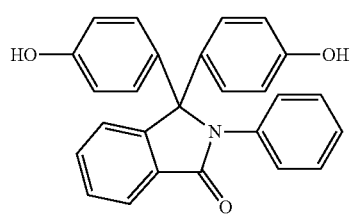
[Chemical formula 9-1]

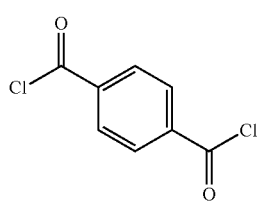
[Chemical formula 9-2]

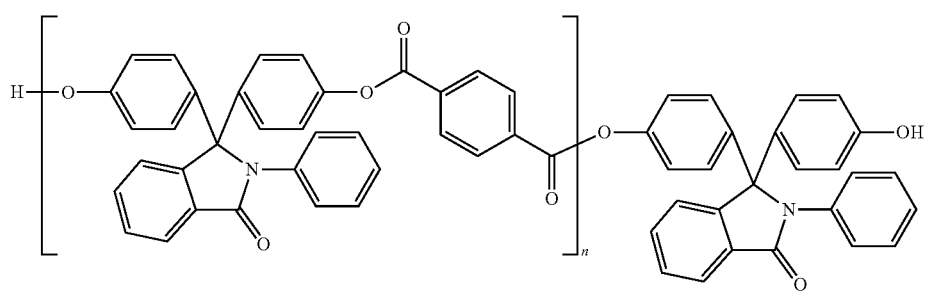
[Chemical formula 9]

Preparation Example 2: Preparation of Phthalimidine Polyester Oligomer Compound of Chemical Formula 9

Excepting that the dropping time was changed from 240 minutes to 150 minutes, the same method as Preparation Example 1 was conducted to obtain the phthalimidine polyester oligomer of chemical formula 9 (number average molecular weight=10,000), where n in chemical formula 9 was 19.

Preparation Example 3: Preparation of Phthalimidine Polyester Oligomer Compound of Chemical Formula 9

Excepting that the dropping time was changed from 240 minutes to 60 minutes, the same method as Preparation Example 1 was conducted to obtain the phthalimidine polyester oligomer of chemical formula 9 (number average molecular weight=20,000), where n in chemical formula 9 was 38.

Preparation Example 4: Preparation of Phthalimidine Polyester Oligomer Compound of Chemical Formula 9

Excepting that the dropping time was changed from 240 minutes to 30 minutes, the same method as Preparation Example 1 was conducted to obtain the phthalimidine polyester oligomer of chemical formula 9 (number average molecular weight=30,000), where n in chemical formula 9 was 56.

Preparation Example 5: Preparation of Phthalimidine Phenyl-Arylene Ether Sulfone Block Oligomer Compound of Chemical Formula 10

A 20 L four-necked flask was equipped with a condenser, and under nitrogen atmosphere, N-phenyl 3,3-bis(4-hydroxyphenyl)phthalimidine (PBHPP) (1.2 mole) of the following chemical formula 10-1,4,4'-dichlorodiphenyl sulfone (DCDPS) (1.0 mole) of the following chemical formula 10-2, potassium carbonate (1.1 mole). N-methyl-2-pyrrolidone (NMP) (10.1 mole) and chlorobenzene (1.11 mole) were fed into the four-necked flask. The temperature of the reaction mixture was rapidly elevated up to the reaction temperature of 170° C., and as the reaction time elapsed, it could be confirmed that the chlorobenzene fed as a cosolvent effused as an azeotropic mixture with the reaction by-product $H_2O$. After the reaction at the temperature of 192° C., for 2 hours, the color of the final reaction mixture was changed to dark brown, and the viscosity of the reaction mixture could be confirmed with naked eye. The final reaction mixture was cooled at room temperature, and hydrochloric acid was added thereto for substituting both terminal groups with hydroxyl groups, and diluted with already prepared dilution solvent NMP. The diluted reaction mixture was filtered through celite filter, and precipitated in methanol. The precipitated product was washed with distilled water and filtered, and then dried to obtain the phthalimidine phenyl-arylene ether sulfone block oligomer compound of the following chemical formula 10 (number average molecular weight=6,000), where n in chemical formula 10 was 10.

[Chemical formula 10-1]

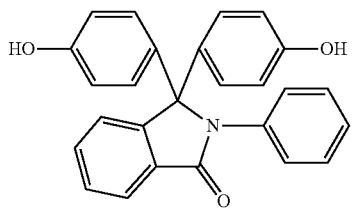

[Chemical formula 10-2]

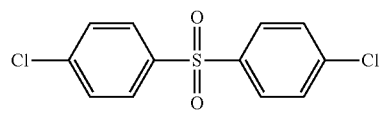

[Chemical formula 10]

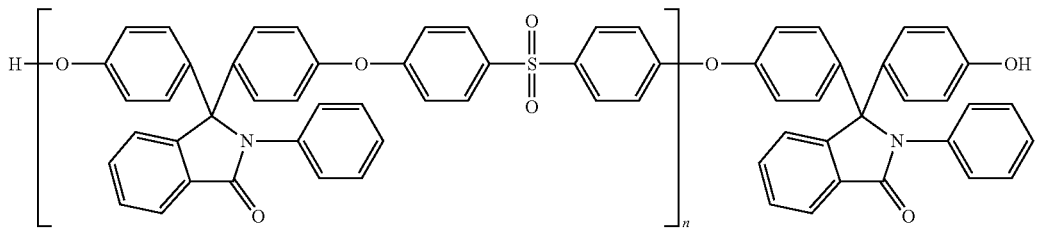

Preparation Example 6: Preparation of Phthalimidine Phenyl-Arylene Ether Sulfone Block Oligomer Compound of Chemical Formula 10

Excepting that the reaction time was changed from 2 hours to 3 hours, the same method as Preparation Example 5 was conducted to obtain the phthalimidine phenyl-arylene ether sulfone block oligomer of chemical formula 10 (number average molecular weight=10,000), where n in chemical formula 10 was 16.

Preparation Example 7: Preparation of Phthalimidine Phenyl-Arylene Ether Sulfone Block Oligomer Compound of Chemical Formula 10

Excepting that the reaction time was changed from 2 hours to 4 hours, the same method as Preparation Example 5 was conducted to obtain the phthalimidine phenyl-arylene ether sulfone block oligomer of chemical formula 10 (number average molecular weight=20,000), where n in chemical formula 10 was 33.

Preparation Example 8: Preparation of Phthalimidine Phenyl-Arylene Ether Sulfone Block Oligomer Compound of Chemical Formula 10

Excepting that the reaction time was changed from 2 hours to 5 hours, the same method as Preparation Example 5 was conducted to obtain the phthalimidine phenyl-arylene ether sulfone block oligomer of chemical formula 10 (number average molecular weight=30,000), where n in chemical formula 10 was 49.

Preparation Example 9: Preparation of Polycarbonate Oligomer

In a 10 L four-necked flask, 600 g (2.63 mole) of bisphenol A was dissolved in 3.300 ml of 5.6 wt % aqueous solution of sodium hydroxide (184.6 g, 4.62 mole), and 260 g (2.63 mole) of phosgene trapped in methylene chloride was slowly added thereto through teflon tube (20 mm) and reacted. The outside temperature was maintained at 0° C. The reactants, which passed through the tubular reactor, were interfacially reacted under a nitrogen atmosphere for about 10 minutes to prepare an oligomeric polycarbonate having a viscosity average molecular weight of about 1,000. From the mixture containing the prepared oligomeric polycarbonate, 2,150 mL of organic phase and 3.220 mL of aqueous phase were collected and mixed with 13.83 g of p-tert-butylphenol (PTBP) (92.1 mmole, 3.5 mol % to bisphenol A), 7.31 g of tetrabutyl ammonium chloride (TBACl) (26.3 mmole, 1 mol % to bisphenol A) and 1 mL of 15 wt % aqueous solution of tri-ethylamine (TEA), and reacted for 30 minutes to prepare a polycarbonate oligomer solution.

Preparation Example 10: Preparation of Polycarbonate Oligomer

Excepting that the amount of p-tert-butylphenol (PTBP) was changed from 13.83 g (92.1 mmole, 3.5 mol % to bisphenol A) to 1.98 g (13.2 mmole, 0.5 mol % to bisphenol A), the same method as Preparation Example 9 was conducted to prepare a polycarbonate oligomer solution.

Preparation Example 11: Preparation of Polycarbonate Block Copolymer

To the polycarbonate oligomer solution prepared in the above Preparation Example 9, 200 g (10% by weight, based on the total weight of the monomer compounds constituting the copolymer) of the compound of the above chemical formula 9 was added. After the phases were separated, only the organic phase was collected and thereto, methylene chloride in the same amount of the organic phase (2,830 g), 1, 100 mL of 1.1 N aqueous solution of sodium hydroxide (20 vol % to the total mixture) and 150 μL of 15 wt % trimethylamine were admixed and reacted for 1 hour, and then 1.670 μL of 15 wt % trimethylamine and 1.280 g of methylene chloride were further added thereto and reacted for additional 1 hour. Alter phase separation, pure water was added to the viscosity-increased organic phase, and it was washed with alkali and separated. Subsequently, the resulting organic phase was washed with 0.1 N hydrochloric acid solution and then rinsed with distilled water 2 or 3 times repeatedly. Alter the rinse was completed, the concentration of the organic phase was adjusted constantly and then granulated by using a constant amount of double-distilled water at 76° C. After the granulation was completed, the product was dried first at 110° C., for 8 hours and then at 120° C., for 10 hours to prepare a polycarbonate block copolymer.

Preparation Example 12: Preparation of Polycarbonate Block Copolymer

Excepting that the amount of the compound of chemical formula 9 was changed from 200 g (10% by weight, based on the total weight of the monomer compounds constituting the copolymer) to 600 g (30% by weight, based on the total weight of the monomer compounds constituting the copolymer), the same method as Preparation Example 11 was conducted to prepare a polycarbonate block copolymer.

Preparation Example 13: Preparation of Polycarbonate Block Copolymer

Excepting that the amount of the compound of chemical formula 9 was changed from 200 g (10% by weight, based on the total weight of the monomer compounds constituting the copolymer) to 1,000 g (50% by weight, based on the total weight of the monomer compounds constituting the copolymer), the same method as Preparation Example 11 was conducted to prepare a polycarbonate block copolymer.

Preparation Example 14: Preparation of Polycarbonate Block Copolymer

Excepting that 600 g (30% by weight, based on the total weight of the monomer compounds constituting the copolymer) of the compound of chemical formula 10 was used instead of 200 g (10% by weight, based on the total weight of the monomer compounds constituting the copolymer) of the compound of chemical formula 9, the same method as Preparation Example 11 was conducted to prepare a polycarbonate block copolymer.

Preparation Example 15: Preparation of Polycarbonate Block Copolymer

Excepting that 1,000 g (50% by weight, based on the total weight of the monomer compounds constituting the copolymer) of the compound of chemical formula 10 was used instead of 200 g (10% by weight, based on the total weight of the monomer compounds constituting the copolymer) of the compound of chemical formula 9, the same method as Preparation Example 11 was conducted to prepare a polycarbonate block copolymer.

Preparation Example 16: Preparation of Thermoplastic Aromatic Polycarbonate (Linear Polycarbonate) Resin A linear polycarbonate having a viscosity average molecular weight of 20,000 was prepared by an interfacial polymerization method.

Preparation Example 17: Preparation of Thermoplastic Aromatic Polycarbonate (Linear Polycarbonate) Resin A linear polycarbonate having a viscosity average molecular weight of 50,000 was prepared by an interfacial polymerization method.

Preparation Example 18: Preparation of Thermoplastic Aromatic Polycarbonate (Branched Polycarbonate) Resin A branched polycarbonate having a viscosity average molecular weight of 26,000 was prepared by an interfacial polymerization method using 0.009 mole of 1,1,1-tris(4-hydroxyphenyl)ethane (THPE).

Preparation Example 19: Preparation of Polysiloxane-Polycarbonate Resin

Bisphenol A in an aqueous solution and phosgene gas were interfacially reacted in the presence of methylene chloride to prepare 4 L of an oligomeric polycarbonate mixture having a viscosity average molecular weight of about 1,000. Together with the obtained oligomeric polycarbonate mixture, 4.5 wt % of hydroxy-terminated siloxane of the following chemical formula 11 (Dow Corning. BY 16-752A) dissolved in methylene chloride, 18 mL of tetrabutyl ammonium chloride (TBACl), 15 g of p-tert-butylphenol (PTBP) and 2.75 mL of trimethylamine (TEA) (15 wt % aqueous solution) were mixed and reacted for 30 minutes. The reacted oligomeric polycarbonate mixture was kept for phase separation, and after the phases were separated, only the organic phase was collected and thereto, 1,700 g of sodium hydroxide aqueous solution, 3,600 g of methylene chloride and 3 mL of 15 wt % trimethylamine aqueous solution were admixed and reacted for 2 hours. After phase separation, the viscosity-increased organic phase was washed with alkali and separated. Subsequently, the resulting organic phase was washed with 0.1 N hydrochloric acid solution and then rinsed with distilled water 2 or 3 times repeatedly. After the rinse was completed, the concentration of the organic phase was adjusted constantly and then granulated by using a constant amount of pure water at 76° C. After the granulation was completed, the product was dried first at 110° C., for 8 hours and then at 120° C., for 10 hours, to prepare a polysiloxane-polycarbonate resin (viscosity average molecular weight=21,000).

[Chemical formula 11]

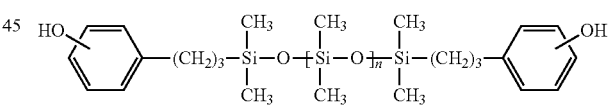

Example 1

1) The polycarbonate block copolymer prepared by the method of Preparation Example 12 using the phthalimidine polyester compound obtained in Preparation Example 1 (number average molecular weight=6,000), 2) the phthalimidine polyester compound obtained in Preparation Example 3 (number average molecular weight=20,000), and 3) the linear polycarbonate obtained in Preparation Example 16 (viscosity average molecular weight=20,000) were mixed with the amounts given in Table 1 below to prepare raw materials. Then, the raw materials were melted and kneaded by using a twin extruder at 260 to 320° C. Subsequently, the melted product coming out through the extrusion die was cooled, and pellets for molding were prepared. The prepared pellets were dried with hot air at 90 to 100° C., for 4 hours or longer, and then subjected to injection molding at 280 to 300° C., to prepare test samples. The properties of the prepared test samples were measured and evaluated, and the results are shown in Table 2 below.

Example 2

Excepting that the phthalimidine polyester compound obtained in Preparation Example 4 (number average molecular weight=30,000) was used instead of the phthalimidine polyester compound obtained in Preparation Example 3 (number average molecular weight=20,000), the same method as Example 1 was conducted to prepare pellets and test samples. The properties of the prepared test samples were measured and evaluated, and the results are shown in Table 2 below.

Example 3

Excepting that the polycarbonate block copolymer was prepared by using the phthalimidine polyester compound obtained in Preparation Example 1 (number average molecular weight=6,000) through the method of Preparation Example 13 instead of the method of Preparation Example 12, the same method as Example 1 was conducted to prepare pellets and test samples. The properties of the prepared test samples were measured and evaluated, and the results are shown in Table 2 below.

Example 4

Excepting that the linear polycarbonate obtained in Preparation Example 17 (viscosity average molecular weight=50,000) was used instead of the linear polycarbonate obtained in Preparation Example 16 (viscosity average molecular weight=20,000) and the amounts of reactants were changed according to Table 1 below, the same method as Example 1 as conducted to prepare pellets and test samples. The properties of the prepared test samples were measured and evaluated, and the results are shown in Table 2 below.

Example 5

Excepting that in preparing the polycarbonate block copolymer by the method of Preparation Example 12, the phthalimidine polyester compound obtained in Preparation Example 2 (number average molecular weight=10,000) was used instead of the phthalimidine polyester compound obtained in Preparation Example 1 (number average molecular weight=6,000), the same method as Example 1 was conducted to prepare pellets and test samples. The properties of the prepared test samples were measured and evaluated, and the results are shown in Table 2 below.

Example 6

Excepting that the amounts of the polycarbonate block copolymer prepared by the method of Preparation Example 12 using the phthalimidine polyester compound obtained in Preparation Example 1 (number average molecular weight=6,000), the phthalimidine polyester compound obtained in Preparation Example 3 (number average molecular weight=20,000) and the linear polycarbonate obtained in Preparation Example 16 (viscosity average molecular weight=20,000) were changed according to Table 1 below, the same method as Example 1 was conducted to prepare pellets and test samples. The properties of the prepared test samples were measured and evaluated, and the results are shown in Table 2 below.

Example 7

Excepting that the amounts of the polycarbonate block copolymer prepared by the method of Preparation Example 12 using the phthalimidine polyester compound obtained in Preparation Example 1 (number average molecular weight=6,000), the phthalimidine polyester compound obtained in Preparation Example 3 (number average molecular weight=20,000) and the linear polycarbonate obtained in Preparation Example 16 (viscosity average molecular weight=20,000) were changed according to Table 1 below, the same method as Example 1 was conducted to prepare pellets and test samples. The properties of the prepared test samples were measured and evaluated, and the results are shown in Table 2 below.

Example 8

Excepting that the branched polycarbonate obtained in Preparation Example 18 (viscosity average molecular weight=26,000) was used instead of the linear polycarbonate obtained in Preparation Example 16 (viscosity average molecular weight=20,000), the same method as Example 1 was conducted to prepare pellets and test samples. The properties of the prepared test samples were measured and evaluated, and the results are shown in Table 2 below, Example 9

Excepting that the polysiloxane-polycarbonate resin obtained in Preparation Example 19 (viscosity average molecular weight=21,000) was used instead of the linear polycarbonate obtained in Preparation Example 16 (viscosity average molecular weight=20,000), the same method as Example 1 was conducted to prepare pellets and test samples. The properties of the prepared test samples were measured and evaluated, and the results are shown in Table 2 below.

Example 10

Excepting that the polycarbonate block copolymer prepared by the method of Preparation Example 14 using the phthalimidine phenyl-arylene ether sulfone compound obtained in Preparation Example 5 (number average molecular weight=6,000) was used instead of the polycarbonate block copolymer prepared by the method of Preparation Example 12 using the phthalimidine polyester compound obtained in Preparation Example 1 (number average molecular weight=6,000), and the phthalimidine phenyl-arylene ether sulfone compound obtained in Preparation Example 7 (number average molecular weight=20,000) was used instead of the phthalimidine polyester compound obtained in Preparation Example 3 (number average molecular weight=20,000), the same method as Example 1 was conducted to prepare pellets and test samples. The properties of the prepared test samples were measured and evaluated, and the results are shown in Table 2 below.

Example 11

Excepting that the phthalimidine phenyl-arylene ether sulfone compound obtained in Preparation Example 8 (number average molecular weight=30,000) was used instead of the phthalimidine phenyl-arylene ether sulfone compound obtained in Preparation Example 7 (number average molecular weight=20,000), the same method as Example 10 was conducted to prepare pellets and test samples. The properties of the prepared test samples were measured and evaluated, and the results are shown in Table 2 below.

Example 12

Excepting that the polycarbonate block copolymer was prepared by using the phthalimidine phenyl-arylene ether sulfone compound obtained in Preparation Example 5 (number average molecular weight=6,000) through the method of Preparation Example 15 instead of the method of Preparation Example 14, the same method as Example 10 was conducted to prepare pellets and test samples. The properties of the prepared test samples were measured and evaluated, and the results are shown in Table 2 below.

Example 13

Excepting that the linear polycarbonate obtained in Preparation Example 17 (viscosity average molecular weight=50,000) was used instead of the linear polycarbonate obtained in Preparation Example 16 (viscosity average molecular weight=20,000) and the amounts of reactants were changed according to Table 1 below, the same method as Example 10 was conducted to prepare pellets and test samples. The properties of the prepared test samples were measured and evaluated, and the results are shown in Table 2 below.

Example 14

Excepting that in preparing the polycarbonate block copolymer by the method of Preparation Example 14, the phthalimidine phenyl-arylene ether sulfone compound obtained in Preparation Example 6 (number average molecular weight=10,000) was used instead of the phthalimidine phenyl-arylene ether sulfone compound obtained in Preparation Example 5 (number average molecular weight=6,000), the same method as Example 10 was conducted to prepare pellets and test samples. The properties of the prepared test samples were measured and evaluated, and the results are shown in Table 2 below, Example 15

Excepting that the amounts of the polycarbonate block copolymer prepared by the method of Preparation Example 14 using the phthalimidine phenyl-arylene ether sulfone compound obtained in Preparation Example 5 (number average molecular weight=6,000), the phthalimidine phenyl-arylene ether sulfone compound obtained in Preparation Example 7 (number average molecular weight=20,000) and the linear polycarbonate obtained in Preparation Example 16 (viscosity average molecular weight=20,000) were changed according to Table 1 below, the same method as Example 10 was conducted to prepare pellets and test samples. The properties of the prepared test samples were measured and evaluated, and the results are shown in Table 2 below.

Example 16

Excepting that the amounts of the polycarbonate block copolymer prepared by the method of Preparation Example 14 using the phthalimidine phenyl-arylene ether sulfone compound obtained in Preparation Example 5 (number average molecular weight=6,000), the phthalimidine phenyl-arylene ether sulfone compound obtained in Preparation Example 7 (number average molecular weight=20,000) and the linear polycarbonate obtained in Preparation Example 16 (viscosity average molecular weight=20,000) were changed according to Table 1 below, the same method as Example 10 was conducted to prepare pellets and test samples. The properties of the prepared test samples were measured and evaluated, and the results are shown in Table 2 below.

Example 17

Excepting that the branched polycarbonate obtained in Preparation Example 18 (viscosity average molecular weight=26,000) was used instead of the linear polycarbonate obtained in Preparation Example 16 (viscosity average molecular weight=20,000), the same method as Example 10 was conducted to prepare pellets and test samples. The properties of the prepared test samples were measured and evaluated, and the results are shown in Table 2 below.

Example 18

Excepting that the polysiloxane-polycarbonate resin obtained in Preparation Example 19 (viscosity average molecular weight=21,000) was used instead of the linear polycarbonate obtained in Preparation Example 16 (viscosity average molecular weight=20,000), the same method as Example 10 was conducted to prepare pellets and test samples. The properties of the prepared test samples were measured and evaluated, and the results are shown in Table 2 below.

Comparative Example 1

Excepting that the linear polycarbonate obtained in Preparation Example 16 (viscosity average molecular weight=20,000) was used as the sole raw material, the same method as Example 1 was conducted to prepare pellets and test samples. The properties of the prepared test samples were measured and evaluated, and the results are shown in Table 2 below.

Comparative Example 2

Excepting that the linear polycarbonate obtained in Preparation Example 17 (viscosity average molecular weight=50,000) was used as the sole raw material, the same method as Example 1 was conducted to prepare pellets and test samples. The properties of the prepared test samples were measured and evaluated, and the results are shown in Table 2 below.

Comparative Example 3

Excepting that the polycarbonate block copolymer prepared by the method of Preparation Example 11 using the phthalimidine polyester compound obtained in Preparation Example 1 (number average molecular weight=6,000) was used as the sole raw material, the same method as Example 1 was conducted to prepare pellets and test samples. The properties of the prepared test samples were measured and evaluated, and the results are shown in Table 2 below.

Comparative Example 4

Excepting that the polycarbonate block copolymer prepared by the method of Preparation Example 12 using the phthalimidine polyester compound obtained in Preparation Example 2 (number average molecular weight=10,000) was used as the sole raw material, the same method as Example 1 was conducted to prepare pellets and test samples. The properties of the prepared test samples were measured and evaluated, and the results are shown in Table 2 below.

Comparative Example 5

Excepting that the polycarbonate block copolymer prepared by the method of Preparation Example 13 using the phthalimidine polyester compound obtained in Preparation Example 1 (number average molecular weight=6,000) was used as the sole raw material, the same method as Example 1 was conducted to prepare pellets and test samples. The properties of the prepared test samples were measured and evaluated, and the results are shown in Table 2 below.

Comparative Example 6

Excepting that the polycarbonate block copolymer prepared by the method of Preparation Example 14 using the phthalimidine phenyl-arylene ether sulfone compound obtained in Preparation Example 5 (number average molecular weight=6,000) was used as the sole raw material, the same method as Example 1 was conducted to prepare pellets and test samples. The properties of the prepared test samples were measured and evaluated, and the results are shown in Table 2 below.

The raw materials used in the above Examples 1 to 18 and Comparative Examples 1 to 6 and amounts thereof (unit: part by weight) are shown in Table 1 below. The meanings of the terms in Table 1 are as follows:

Mn: Number average molecular weight
Mv: Viscosity average molecular weight

Block copolymer (1): The polycarbonate block copolymer prepared by the method of Preparation Example 11 using the phthalimidine polyester compound obtained in Preparation Example 1 (Mn=6,000) (Amount of the phthalimidine polyester compound: 10% by weight, based on the total weight of the monomer compounds constituting the copolymer)

Block copolymer (2): The polycarbonate block copolymer prepared by the method of Preparation Example 12 using the phthalimidine polyester compound obtained in Preparation Example 1 (Mn=6,000) (Amount of the phthalimidine polyester compound: 30% by weight, based on the total weight of the monomer compounds constituting the copolymer)

Block copolymer (3): The polycarbonate block copolymer prepared by the method of Preparation Example 12 using the phthalimidine polyester compound obtained in Preparation Example 2 (Mn=10,000) (Amount of the phthalimidine polyester compound: 30% by weight, based on the total weight of the monomer compounds constituting the copolymer)

Block copolymer (4): The polycarbonate block copolymer prepared by the method of Preparation Example 13 using the phthalimidine polyester compound obtained in Preparation Example 1 (Mn=6,000) (Amount of the phthalimidine polyester compound: 50% by weight, based on the total weight of the monomer compounds constituting the copolymer)

Block copolymer (5): The polycarbonate block copolymer prepared by the method of Preparation Example 14 using the phthalimidine phenyl-arylene ether sulfone compound obtained in Preparation Example 5 (Mn=6,000) (Amount of the phthalimidine phenyl-arylene ether sulfone compound: 30% by weight, based on the total weight of the monomer compounds constituting the copolymer)

Block copolymer (6): The polycarbonate block copolymer prepared by the method of Preparation Example 14 using the phthalimidine phenyl-arylene ether sulfone compound obtained in Preparation Example 6 (Mn=10,000) (Amount of the phthalimidine phenyl-arylene ether sulfone compound: 30% by weight, based on the total weight of the monomer compounds constituting the copolymer)

Block copolymer (7): The polycarbonate block copolymer prepared by the method of Preparation Example 15 using the phthalimidine phenyl-arylene ether sulfone compound obtained in Preparation Example 5 (Mn=6,000) (Amount of the phthalimidine phenyl-arylene ether sulfone compound: 50% by weight, based on the total weight of the monomer compounds constituting the copolymer)

TABLE 1

| Materials | Examples | | | | | | | | |
|---|---|---|---|---|---|---|---|---|---|
| | 1 | 2 | 3 | 4 | 5 | 6 | 7 | 8 | 9 |
| Phthalimidine polyester compound (Mn = 20,000) | 33.33 | — | 33.33 | 40.0 | 33.33 | 40.0 | 57.1 | 33.33 | 33.33 |
| Phthalimidine polyester compound (Mn = 30,000) | — | 33.33 | — | — | — | — | — | — | — |
| Block copolymer (2) | 33.33 | 33.33 | — | 40.0 | — | 20.0 | 14.3 | 33.33 | 33.33 |
| Block copolymer (3) | — | — | — | — | 33.3 | — | — | — | — |
| Block copolymer (4) | — | — | 33.3 | — | — | — | — | — | — |
| Linear polycarbonate (Mv = 20,000) | 33.33 | 33.33 | 33.33 | — | 33.33 | 40.0 | 28.6 | — | — |
| Linear polycarbonate (Mv = 50,000) | — | — | — | 20.0 | — | — | — | — | — |
| Branched polycarbonate (Mv = 26,000) | — | — | — | — | — | — | — | 33.33 | — |
| Polysiloxane-polycarbonate (Mv = 21,000) | — | — | — | — | — | — | — | — | 33.33 |

TABLE 1-continued

| Materials | Examples |  |  |  |  |  |  |  |  |
|---|---|---|---|---|---|---|---|---|---|
|  | 10 | 11 | 12 | 13 | 14 | 15 | 16 | 17 | 18 |
| Phthalimidine phenyl-arylene ether sulfone compound (Mn = 20,000) | 33.33 | — | 33.33 | 40.0 | 33.33 | 40.0 | 57.1 | 33.33 | 33.33 |
| Phthalimidine phenyl-arylene ether sulfone compound (Mn = 30,000) | — | 33.33 | — | — | — | — | — | — | — |
| Block copolymer (5) | 33.33 | 33.33 | — | 40.0 | — | 20.0 | 14.3 | 33.3 | 33.3 |
| Block copolymer (6) | — | — | — | — | 33.33 | — | — | — | — |
| Block copolymer (7) | — | — | 33.33 | — | — | — | — | — | — |
| Linear polycarbonate (Mv = 20,000) | 33.33 | 33.33 | 33.33 | — | 33.33 | 40.0 | 28.6 | — | — |
| Linear polycarbonate (Mv = 50,000) | — | — | — | 20.0 | — | — | — | — | — |
| Branched polycarbonate (Mv-26,000) | — | — | — | — | — | — | — | 33.33 | — |
| Polysiloxane-polycarbonate (Mv = 21,000) | — | — | — | — | — | — | — | — | 33.33 |

| Materials | Comparative Examples |  |  |  |  |  |
|---|---|---|---|---|---|---|
|  | 1 | 2 | 3 | 4 | 5 | 6 |
| Linear polycarbonate (Mv = 20,000) | 100 |  |  |  |  |  |
| Linear polycarbonate (Mv = 50,000) |  | 100 |  |  |  |  |
| Block copolymer (1) |  |  | 100 |  |  |  |
| Block copolymer (3) |  |  |  | 100 |  |  |
| Block copolymer (4) |  |  |  |  | 100 |  |
| Block copolymer (5) |  |  |  |  |  | 100 |

The properties of the test samples prepared in the above Examples 1 to 18 and Comparative Examples 1 to 6 were measured according to the following methods, and the results are shown in Table 2 below.

(1) Glass transition temperature: The glass transition temperature was measured by using a differential scanning calorimeter (DSC-7 & Robotic, Perkin-Elmer).

(2) Flowability: The flowability was measured according to ASTM D1238 at the conditions of 330° C., and 2.16 kgf.

As can be seen from the above Table 2, in case of Examples 1 to 18 according to the present invention, since the compositions comprised a polyester compound of the specific structural formula or a phenyl-arylene ether sulfone compound of the specific structural formula: a polycarbonate block copolymer; and a thermoplastic aromatic polycarbonate resin or a polysiloxane-polycarbonate resin, they showed remarkably excellent heat resistance and also had good balance of properties such as flowability, etc. However, in case of Comparative Examples 1 to 6 which were not

TABLE 2

| | Examples | | | | | | | | |
|---|---|---|---|---|---|---|---|---|---|
| | 1 | 2 | 3 | 4 | 5 | 6 | 7 | 8 | 9 |
| Glass transition temperature (° C.) | 220 | 228 | 231 | 221 | 218 | 226 | 236 | 219 | 215 |
| Flowability (g/10 min) | 7.3 | 6.1 | 5.7 | 6.0 | 6.8 | 7.8 | 6.8 | 7.0 | 5.8 |

| | Examples | | | | | | | | |
|---|---|---|---|---|---|---|---|---|---|
| | 10 | 11 | 12 | 13 | 14 | 15 | 16 | 17 | 18 |
| Glass transition temperature (° C.) | 222 | 230 | 230 | 218 | 222 | 225 | 243 | 218 | 215 |
| Flowability (g/10 min) | 6.9 | 5.8 | 5.6 | 6.3 | 6.7 | 7.5 | 6.1 | 7.2 | 5.5 |

| | Comparative Examples | | | | | |
|---|---|---|---|---|---|---|
| | 1 | 2 | 3 | 4 | 5 | 6 |
| Glass transition temperature (° C.) | 150 | 152 | 162 | 212 | 228 | 215 |
| Flowability (g/10 min) | 32 | 30 | 10 | 0.5 | 0.1 | 0.4 | according to the present invention, since a thermoplastic aromatic polycarbonate resin or a polycarbonate block copolymer was used solely, the heat resistance was poor (Comparative Examples 1 to 3), or the flowability was seriously lowered (Comparative Examples 4 to 6).

The invention claimed is:

1. A polycarbonate resin composition comprising:
   (1) a polyester compound having a structure of the following chemical formula 1 or a phenyl-arylene ether sulfone compound having a structure of the following chemical formula 2;
   (2) a polycarbonate block copolymer comprising, as repeating units, a compound selected from a polyester compound having a structure of the following chemical formula 1 or a from a polyester compound having a structure of the following chemical formula 1 or a phenyl-arylene ether sulfone compound having a structure of the following chemical formula 2; and a polycarbonate block; and
   (3) a thermoplastic aromatic polycarbonate resin or a polysiloxane-polycarbonate resin:

[Chemical formula 1]

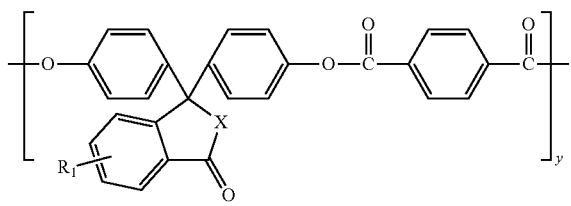

in the above chemical formula 1, $R_1$ independently represents hydrogen atom, alkyl having 1 to 4 carbon atoms, cycloalkyl having 3 to 6 carbon atoms, cycloalkylalkyl having 4 to 10 carbon atoms, or aryl having 6 to 10 carbon atoms;

X represents oxygen atom or $NR_2$, where $R_2$ represents hydrogen atom; alkyl having 1 to 4 carbon atoms; cycloalkyl having 3 to 10 carbon atoms which is unsubstituted or substituted with one or more substituents selected from the group consisting of halogen atoms and alkyl groups having 1 to 4 carbon atoms; or aryl having 6 to 10 carbon atoms which is unsubstituted or substituted with one or more substituents selected from the group consisting of halogen atoms and alkyl groups having 1 to 4 carbon atoms; and y is an integer of 2 to 50;

[Chemical formula 2]

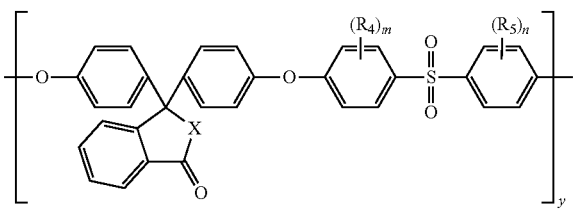

in the above chemical formula 2, each of $R_4$ and $R_5$ independently represents hydrocarbyl having 1 to 10 carbon atoms;

each of m and n is independently an integer of 0 to 4;

y is an integer of 2 to 150; and

X represents oxygen atom or $NR_2$, where $R_2$ represents hydrogen atom; alkyl having 1 to 4 carbon atoms; cycloalkyl having 3 to 10 carbon atoms which is unsubstituted or substituted with one or more substituents selected from the group consisting of halogen atoms and alkyl groups having 1 to 4 carbon atoms; or aryl having 6 to 10 carbon atoms which is unsubstituted or substituted with one or more substituents selected from the group consisting of halogen atoms and alkyl groups having 1 to 4 carbon atoms.

2. The polycarbonate resin composition according to claim 1, which comprises, based on 100 parts by weight of the composition,
   (1) the polyester compound having a structure of chemical formula 1 or the phenyl-arylene ether sulfone compound having a structure of chemical formula 2 in an amount of 10 to 80 parts by weight,
   (2) the polycarbonate block copolymer in an amount of 5 to 60 parts by weight, and
   (3) the thermoplastic aromatic polycarbonate resin or the polysiloxane-polycarbonate resin in an amount of 10 to 60 parts by weight.

3. The polycarbonate resin composition according to claim 1, wherein the polyester compound having a structure of chemical formula 1 is that prepared by condensation reaction of a compound represented by the following chemical formula 1-1 and a compound represented by the following chemical formula 1-2:

[Chemical formula 1-1]

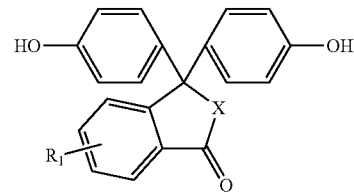

[Chemical formula 1-2]

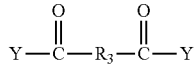

in the above chemical formulas 1-1 and 1-2, $R_1$ independently represents hydrogen atom, alkyl having 1 to 4 carbon atoms, cycloalkyl having 3 to 6 carbon atoms, cycloalkylalkyl having 4 to 10 carbon atoms, or aryl having 6 to 10 carbon atoms;

X represents oxygen atom or $NR_2$, where $R_2$ represents hydrogen atom; alkyl having 1 to 4 carbon atoms; cycloalkyl having 3 to 10 carbon atoms which is unsubstituted or substituted with one or more substituents selected from the group consisting of halogen atoms and alkyl groups having 1 to 4 carbon atoms; or aryl having 6 to 10 carbon atoms which is unsubstituted or substituted with one or more substituents selected from the group consisting of halogen atoms and alkyl groups having 1 to 4 carbon atoms;

Y independently represents hydroxyl or halogen atom; and $R_3$ represents benzene ring.

4. The polycarbonate resin composition according to claim 1, wherein the phenyl-arylene ether sulfone compound having a structure of chemical formula 2 is that prepared by polymerization condensation reaction of a compound represented by the following chemical formula 2-1 and a compound represented by the following chemical formula 2-2:

[Chemical formula 2-1]

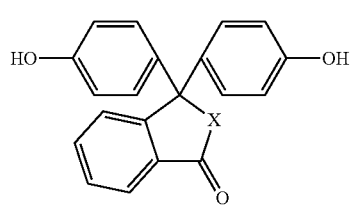

in the above chemical formula 2-1,

X represents oxygen atom or $NR_2$, where $R_2$ represents hydrogen atom; alkyl having 1 to 4 carbon atoms; cycloalkyl having 3 to 10 carbon atoms which is unsubstituted or substituted with one or more substituents selected from the group consisting of halogen atoms and alkyl groups having 1 to 4 carbon atoms; or aryl having 6 to 10 carbon atoms which is unsubstituted or substituted with one or more substituents selected from the group consisting of halogen atoms and alkyl groups having 1 to 4 carbon atoms;

[Chemical formula 2-2]

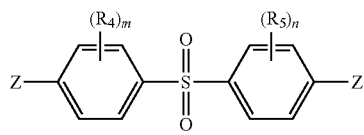

in the above chemical formula 2-2, each of $R_4$ and $R_5$ independently represents hydrocarbyl having 1 to 10 carbon atoms; each of m and n is independently an integer of 0 to 4; and each of Z is independently halogen atom or hydroxyl.

5. The polycarbonate resin composition according to claim 1, wherein the polyester compound having a structure of chemical formula 1 or the phenyl-arylene ether sulfone compound having a structure of chemical formula 2 has a number average molecular weight (Mn) of 500 to 30,000 g/mol.

6. The polycarbonate resin composition according to claim 1, which comprises:
(1) the polyester compound having a structure of chemical formula 1;
(2) a polycarbonate block obtained by reacting the polyester compound having a structure of chemical formula 1 with a polycarbonate oligomer; and
(3) the thermoplastic aromatic polycarbonate resin or the polysiloxane-polycarbonate resin.

7. The polycarbonate resin composition according to claim 1, which comprises:
(1) the phenyl-arylene ether sulfone compound having a structure of chemical formula 2;
(2) a polycarbonate block obtained by reacting the phenyl-arylene ether sulfone compound having a structure of chemical formula 2 with a polycarbonate oligomer; and
(3) the thermoplastic aromatic polycarbonate resin or the polysiloxane-polycarbonate resin.

8. The polycarbonate resin composition according to claim 1, wherein the polysiloxane-polycarbonate resin comprises a hydroxy-terminated siloxane of the following chemical formula 6 and a polycarbonate block of the following chemical formula 7 as repeating units:

[Chemical formula 6]

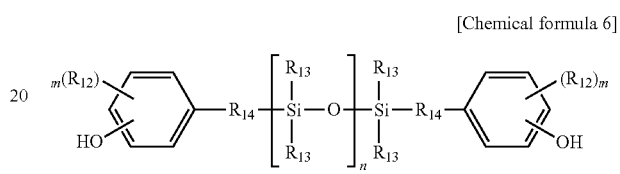

in the above chemical formula 6, $R_{12}$ independently represents hydrogen atom, halogen atom, hydroxy group, alkyl group having 1 to 20 carbon atoms, alkoxy group having 1 to 20 carbon atoms, or aryl group having 6 to 20 carbon atoms, $R_{13}$ independently represents hydrocarbyl group having 1 to 13 carbon atoms or hydroxy group, $R_{14}$ independently represents alkylene group having 2 to 8 carbon atoms, m independently represents an integer of 0 to 4, and n independently represents an integer of 2 to 1,000;

[Chemical formula 7]

in the above chemical formula 7, $R_{15}$ represents an aromatic hydrocarbyl group having 6 to 30 carbon atoms which is unsubstituted or substituted with alkyl group having 1 to 20 carbon atoms, cycloalkyl group having 3 to 6 carbon atoms, alkenyl group having 2 to 13 carbon atoms, alkoxy group having 1 to 13 carbon atoms, halogen atom, or nitro group.

9. The polycarbonate resin composition according to claim 1, wherein the polycarbonate block copolymer comprises, as repeating units, a compound selected from the polyester compound having a structure of chemical formula 1 or the phenyl-arylene ether sulfone compound having a structure of chemical formula 2, and the amount of the compound selected from the polyester compound having a structure of chemical formula 1 or the phenyl-arylene ether sulfone compound having a structure of chemical formula 2 contained in the polycarbonate block copolymer is 0.5 to 50% by weight, based on the total weight of the monomer compounds constituting the polycarbonate block copolymer as 100% by weight.

10. A molded article comprising the polycarbonate resin composition of claim 1.

* * * * *